Aug. 10, 1943.　　　R. E. MARBURY　　　2,326,152
WATER COOLED CAPACITOR
Filed Oct. 18, 1941　　　2 Sheets-Sheet 1

Insulation

WITNESSES:
C. J. Weller,
F. P. Lyle

INVENTOR
Ralph E. Marbury.
BY O. B. Buchanan
ATTORNEY

Aug. 10, 1943.  R. E. MARBURY  2,326,152
WATER COOLED CAPACITOR
Filed Oct. 18, 1941  2 Sheets-Sheet 2

WITNESSES:

INVENTOR
Ralph E. Marbury.
BY
ATTORNEY

Patented Aug. 10, 1943

2,326,152

UNITED STATES PATENT OFFICE 2,326,152

WATER-COOLED CAPACITOR

Ralph E. Marbury, Wilkinsburg, Pa., assignor to Westinghouse Electric & Manufacturing Company, East Pittsburgh, Pa., a corportion of Pennsylvania Application October 18, 1941, Serial No. 415,622

7 Claims. (Cl. 175—41)

The present invention relates to electrical capacitors, and more particularly to an improved water-cooled capacitor which is especially adapted for high frequency service.

At the present time, the use of high frequency induction heating is rapidly increasing for such processes as heating and melting of metals and certain types of heat treatment. Frequencies of the order of 1000 or 2000 cycles have been used for this type of heating, but much higher frequencies, of the order of 10,000 cycles, are now being used, and there is a trend to the use of still higher frequencies. The equipment utilized for supplying this high frequency induction heating apparatus has a very poor power factor, and in order to make the process economically practical, it is necessary to correct the power factor, by means of capacitors, to a point where the cost of the high frequency generating equipment required is not excessive. The capacitor unit of the present invention is particularly intended for this service, although its usefulness is not necessarily restricted to this specific application, and it can be used on frequencies as high as may be desired.

When it is attempted to design a capacitor for use on these high frequencies, numerous problems arise which are not encountered in the design of capacitors for use on low frequencies, such as 60 cycles, and when frequencies as high as 10,000 cycles are used there are additional problems which are not important at frequencies such as 2,000 cycles. The kva. capacity of a given capacitor structure increases in direct proportion to the frequency, but as the frequency is increased, the losses in the unit will increase in at least the same proportion, and since these losses appear in the form of heat, the rating which can be given to a high frequency capacitor is limited by the temperature rise caused by the losses. In order to take advantage of the higher kva. capacity of a given sized capacitor unit on high frequencies, it is necessary to provide means for cooling the unit to remove the heat generated in the dielectric, and the kva. rating which can be given to the unit depends on the effectiveness of the cooling means in removing this heat and keeping the temperature of the dielectric within safe limits.

The very high capacities that are obtainable by such artificial cooling for capacitors of relatively small size result in very heavy currents, and the rating of high frequency capacitors has also been limited in the past by the current carrying ability of the internal leads and terminal studs used in steel-case capacitors of conventional construction. This problem is especially acute in the case of capacitors for relatively low voltage, such as 200 to 300 volts, since the high kva. capacity and the low voltage cause very high currents to flow through the capacitor. There is a definite trend toward connecting capacitors at the load, which in most cases means that they must be designed for voltages in the range from 200 to 600 volts, and with the high capacities that are obtainable by means of water cooling, such capacitors must be able to carry currents of the order of 1000 to 2000 amperes. It is extremely difficult, if possible at all, to build capacitors of the conventional steel-case construction which are capable of handling such high currents. These heavy currents also lead to other difficulties, since heavy bus bars must be used to connect the capacitors of a bank together and to the external circuit, and trouble has been caused by breakage of porcelain terminal bushings under the mechanical stresses imposed on them by the heavy bus bars.

Other problems are also encountered in the use of conventional capacitor constructions for high frequency service because of the hysteresis loss in the steel case, and the eddy current losses caused by conducting currents through terminals which pass through openings in the steel case. These losses add to the total losses and are objectionable because they produce localized heating of the steel case, which may become hot enough in some places to melt solder and thus loosen soldered connections. Special means are required to avoid the effects of this localized heating, which considerably increases the cost of the unit. Thus, it is apparent that the design of a capacitor for high frequency service involves many problems and difficulties which are not present in the design of capacitors for lower frequencies.

A water-cooled capacitor for high frequency service which overcomes these difficulties in a very effective manner is disclosed and claimed in my copending application, Serial No. 367,368, filed November 27, 1940, and assigned to Westinghouse Electric & Manufacturing Company. The capacitor of this prior application provides a construction in which very effective cooling is obtained, as much as 98% or 99% of the heat generated in the unit being removed by the cooling water, and it has very high current carrying capacity, since the cooling coil itself is used to connect the entire cross-section of the capacitor foils to metal end covers, thus eliminating internal leads and terminal studs. The capacitor of the present invention may be considered an improvement on the capacitor shown in this prior application, as it provides a simpler and less expensive construction which is readily adapted to quantity production, but which has substantially equivalent effectiveness of cooling and current carrying capacity.

The principal object of the invention, therefore, is to provide a water-cooled capacitor unit for high frequency service in which the heat generated by the losses in the dielectric is very effectively removed, and which is of relatively simple and inexpensive construction as compared to previous designs of water-cooled capacitors.

Another object of the invention is to provide a water-cooled capacitor unit of relatively inexpensive construction in which no internal leads or terminal studs are required, and which has very high current carrying capacity.

A more specific object of the invention is to provide a capacitor unit in which water, or other cooling medium, is circulated through annular conduits or water jackets at both ends of the unit to withdraw the heat directly from the capacitor element itself, and in which the necessity for the relatively expensive cooling coils of metal tubing which were previously used is eliminated so that a relatively simple structure is provided which can be manufactured at low cost and which is adapted to quantity production.

Further objects and advantages of the invention will be apparent from the following detailed description, taken in connection with the accompanying drawings, in which.

Figure 1:
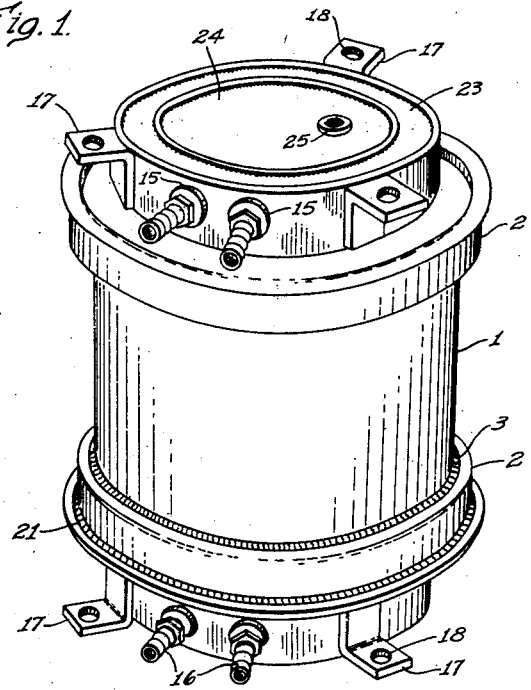
Figure 1 is a perspective view of a capacitor unit embodying the present invention.

In the preferred embodiment of the invention shown in the drawings, the capacitor unit is contained in a generally cylindrical housing 1, which is preferably of porcelain, and which has end rings 2 secured to it at each end for attachment of the cover assemblies, as described hereinafter. The end rings 2 are preferably made of copper, and, as clearly shown in Fig. 2, they are of U-shaped cross-section, having the outside leg longer than the inner leg. The rings 2 are attached to the ends of the housing 1 by soldering them to a metalized surface of the porcelain, as indicated at 3, to attach them securely to the housing with a permanent, liquid-tight joint.

The capacitor element 4, which is contained in the housing, consists of alternate layers of thin copper foil and dielectric material, which is preferably thin paper of high dielectric strength. The interleaved metal foils and dielectric layers are wound up spirally on a fiber rod or stud 5, or, if desired, the capacitor element 4 may be wound on a fiber tube, the rod 5 being afterwards inserted in the tube. The thickness of the foils and dielectric is greatly exaggerated in Fig. 2 for the sake of clearness, and, as shown in this figure, the foils 6 of one polarity are extended beyond the dielectric layers 7 at one side of the element, while the foils 8 of opposite polarity are extended beyond the dielectric layers 7 at the other side. The foils and dielectric are made long enough to have the desired capacitance, and the capacitor element is wound on the rod 5 in a single section or winding. After completion of the winding operation, the capacitor element may be impregnated with a suitable insulating compound in the usual manner.

Figure 3:
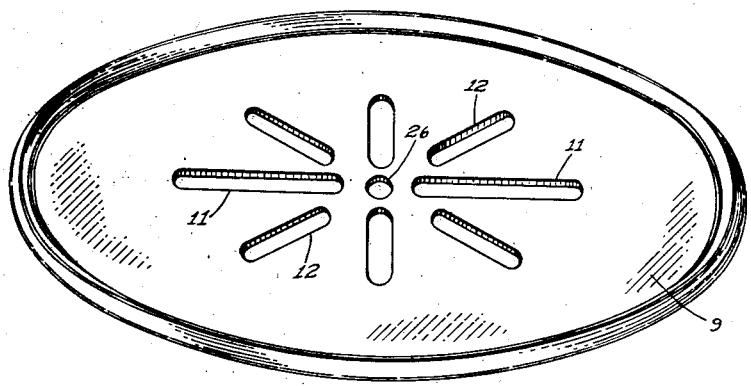
Fig. 3 is a perspective view of a cover plate.

The housing is closed at each end by a cover assembly to which the extending capacitor foils are directly joined. The cover assembly is identical at both ends of the unit, and includes a cover plate 9 and an annular conduit or water jacket 10. The cover plate 9, which is preferably of copper, is shown more clearly in Figs. 3 and 4, and is generally disk-shaped, having a central hole 26 of large enough diameter to permit the fiber rod 5 to pass through it, and a plurality of radial slots 11 and 12. Alternate slots 11 are made long enough to extend over the entire radial thickness of the capacitor element 4 when the cover plate is assembled in position on the housing, while the intervening slots 12 may be made shorter. The outer periphery of the cover plate 9 is bent up to form an annular groove 13 extending around the entire circumference of the plate to facilitate attachment of the plate to the end rings 2, as described below.

Figure 2:
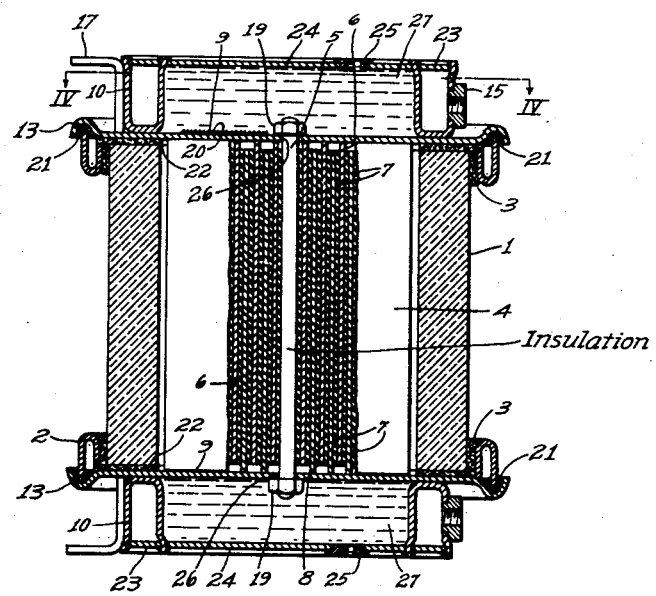
Fig. 2 is a vertical sectional view of the unit shown in Fig. 1.
Figure 4:
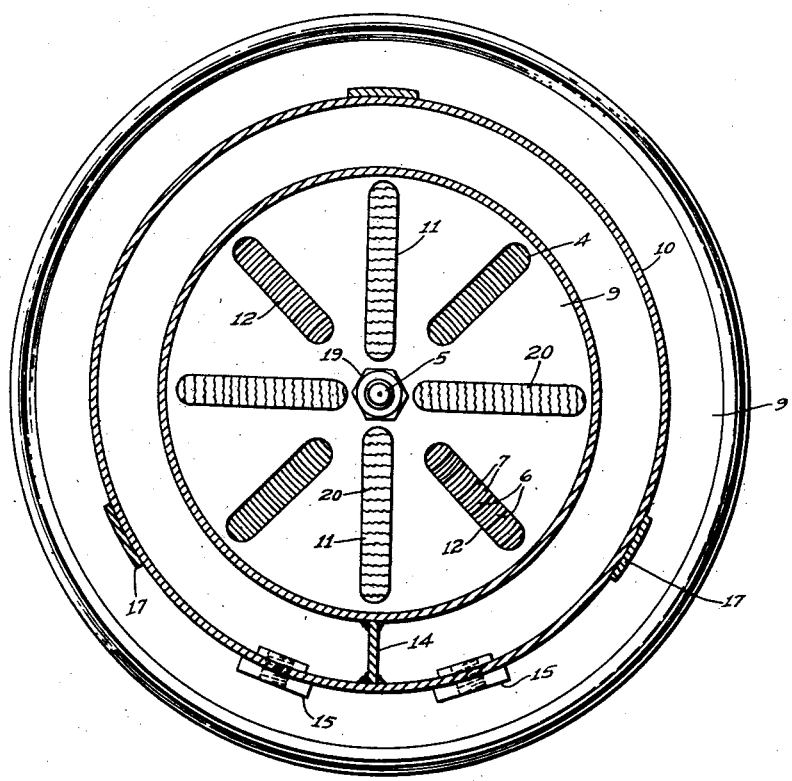
Fig. 4 is an enlarged sectional plan view approximately on the line IV—IV of Fig. 2.

The cover assembly also includes the annular water jacket or conduit 10. This member is also preferably of copper, and as clearly shown in Fig. 2, is of U-shaped cross-section and of large enough size to permit a considerable volume of water or other liquid to flow through it. The conduit 10 is brazed to the cover plate 9, and a partition 14 is brazed in position inside the conduit 10, as shown in Fig. 4. Bushings 15 are secured in the conduit on opposite sides of the partition 14, so that the water flowing in through one of the bushings will be discharged through the other, the partition 14 serving to prevent recirculation of the heated water. If desired, standard fittings 16 may be secured to each of the bushings 15 for connection to an external water supply system. Three copper lugs or brackets 17 are brazed to the outer surface of the conduit 10 at points 120° apart. These lugs have holes 18 drilled in them for the reception of bolts, and are used to provide for mechanical support of the unit and for electrical connection to it.

In assembling the capacitor unit, the cover assemblies, consisting of the plates 9 and conduits 10, are placed at opposite ends of the housing 1, with the fiber rod 5 of the capacitor element 4 extending through the central holes 26 of the plates 9. The ends of the rod 5 are threaded, and the plates 9 are clamped against the extending foils 6 and 8 of the capacitor element by means of nuts 19. The extending foils 6 and 8 are then soldered directly to the cover plates 9 through the slots 11, as indicated at 20, to connect the foils permanently and solidly to the plates with a connection of good thermal and electrical conductivity. It is to be noted that the entire cross-section of the foils is thus joined to the plates 9. The end rings 2 of the housing 1 extend into the grooves 13 at the periphery of the plates 9, and the plates are attached to the housing by soldering the rings 2 in these grooves, as indicated at 21. Gaskets 22 are placed between the housing 1 and the cover plates 9 to serve the double purpose of making the joint liquid-tight, and of preventing the direct flow of heat from the soldering operation in the grooves 13 to the previously made soldered joints 3. The long outer leg of the U-shaped rings 2 permits the heat flowing from the soldering operation to be dissipated before reaching the joints 3, so that the later soldering operation does not affect the previously made joint 3.

The conduit 10 is closed at the top by an annular ring 23 of copper, which is brazed in position to completely close the conduit. The space inside the annular conduit is closed by a circular copper cover 24, which is brazed to the inside surface of the conduit 10 at the top of its inner wall, as shown in Fig. 2, thus forming an enclosed space which communicates with the interior of the housing and the capacitor element through the open slots 12. A small bushing 25 may be provided in each plate 24, and, after the unit has been completely assembled, and thoroughly dried out, it is filled through these openings with a suitable liquid insulating compound 27, after which the bushings 25 are plugged and permanently sealed up.

In use, two or more of the capacitor units of the present invention may be connected together simply by stacking them one on top of the other and connecting them with bolts through the holes 18 in the lugs 17, which provides both mechanical and electrical connection between adjacent units. Such a stack is connected to other similar stacks, and to the circuit on which they are to be used, by means of bus bars connected to the lugs 17. The bushings 15 are connected to a suitable source of cooling water, or other suitable cooling medium, and adjacent units of a stack may have their cooling conduits connected together by rubber tubing, which insulates the conducting parts of the units from each other and permits the water to flow through the conduits of a number of units in series.

It should now be apparent that a capacitor construction has been provided which is relatively simple and which can be manufactured at low cost, since it does not require any complicated cooling coil or other parts which are difficult to produce. Very effective cooling is provided as a reasonably large volume of water can be circulated through the conduits 10, which form a part of the cover assemblies to which the capacitor foils are directly joined. Thus, a very high percentage of the heat generated in the unit is transferred directly to the cooling water, and a very high rating can be given to a unit of relatively small size. The current carrying capacity of this new capacitor is very high, since the entire cross-section of the foil is connected to the plate 9, and the current flows through this plate and through the walls of the conduit 10, which serves as a water-cooled conductor, to the brackets 17. Thus the rating of the unit is not limited by the current carrying ability of any internal leads or terminals.

It is to be understood that, although a preferred embodiment of the invention has been illustrated and desscribed, various changes and modifications may be made within the scope of the invention. Thus, glass or other insulating material might be used for the housing 1 instead of porcelain, and a suitable material used for the rings 2 which can be sealed or otherwise secured to the housing 1 with a permanent liquid-tight joint. If desired, each of the cover assemblies, consisting of the plate 9 and conduit 10, could be made a single integral member, by casting it from a suitable metal, such as brass. Thus, it will be apparent that various modifications may be made, and it is to be understood that the invention is not limited to the exact constructional details shown and described, but in its broadest aspects, it includes all embodiments and modifications which come within the scope of the appended claims.

I claim as my invention:

1. A capacitor unit having a generaly cylindrical housing member of insulating material, a capacitance element disposed in the housing member, said capacitance element comprising alternate layers of metallic foil and dielectric material, certain of the metal foils extending beyond the dielectric layers at one side of the element and others of the metal foils extending beyond the dielectric layers at the other side, a metal plate at each side of the capacitance element, means for clamping said plates against the capacitance element, the extending metal foils at each side being joined to the plate at that side with a connection of good thermal and electrical conductivity, means securing said metal plates to the housing member with a liquid-tight joint, and enclosing means secured to said plates outside the housing, said enclosing means providing an enclosed space at each end of the unit, said spaces and the housing being substantially filled with an insulating liquid, and said enclosing means including an annular conduit encircling the enclosed space for the circulation of a liquid cooling medium.

2. A capacitor unit having a generally cylindrical housing member of insulating material, a capacitance element disposed in the housing member, said capacitance element comprising alternate layers of metallic foil and dielectric material, certain of the metal foils extending beyond the dielectric layers at one side of the element and other of the metal foils extending beyond the dielectric layers at the other side, a metal plate at each side of the capacitance element having a plurality of radial slots therein, means for clamping said plates against the capacitance element, the extending metal foils at each side being joined to the plate at that side through at least some of the slots in the plate with a connection of good thermal and electrical conductivity, means securing said metal plates to the housing member with a liquid-tight joint, and enclosing means secured to said plates outside the housing, said enclosing means providing an enclosed space at each end of the unit communicating with the housing through said slots, said spaces and the housing being substantially filled with an insulating liquid, and said enclosing means including an annular conduit encircling the enclosed space for the circulation of a liquid cooling medium.

3. A capacitor unit having a generally cylindrical housing member of insulating material, a capacitance element disposed in the housing member, said capacitance element comprising alternate layers of metallic foil and dielectric material, certain of the metal foils extending beyond the dielectric layers at one side of the element and others of the metal foils extending beyond the dielectric layers at the other side, a metal plate at each side of the capacitance element having a plurality of radial slots therein, means for clamping said plates against the capacitance element, the extending metal foils at each side being joined to the plate at that side through at least some of the slots in the plate with a connection of good thermal and electrical conductivity, means securing said metal plates to the housing member with a liquid-tight joint, an annular conduit on each of said plates outside the housing, inlet and discharge means in said conduits to permit the circulation of a liquid cooling medium therethrough, closure members enclosing the spaces within said conduits, the enclosed spaces thus formed communicating with the housing through the slots in the plates, and an insulating liquid substantially filling the enclosed spaces and the housing.

4. A capacitor unit having a generally cylindrical housing member of insulating material, a capacitance element disposed in the housing member, said capacitance element comprising alternate layers of metal foil and dielectric material, certain of the metal foils extending beyond the dielectric layers at one side of the capacitance element and others of the metal foils extending beyond the dielectric layers at the other side, and a cover assembly at each end of said housing member and sealed thereto, each of said assemblies including a metal plate, means for clamping said plate against the adjacent side of the capacitance element, the extending metal foils of the capacitance element being joined to the plate with a connection of good thermal and electrical conductivity, each of said cover assemblies also including cooling means joined to said metal plate with a connection of good thermal and electrical conductivity, said cooling means being adapted for the circulation of a liquid cooling medium therethrough, and each of said cover assemblies also having cover means for closing the end of the capacitor unit.

5. A capacitor unit having a generally cylindrical housing member of insulating material, a capacitance element disposed in the housing member, said capacitance element comprising alternate layers of metal foil and dielectric material, certain of the metal foils extending beyond the dielectric layers at one side of the capacitance element and others of the metal foils extending beyond the dielectric layers at the other side, and a cover assembly at each end of said housing member and sealed thereto, each of said assemblies including a metal plate, means for clamping said plate against the adjacent side of the capacitance element, said plate having a plurality of openings therein, and the extending metal foils of the capacitance element being joined to the plate through at least some of said openings with connections of good thermal and electrical conductivity, each of said cover assemblies also including cooling means joined to said metal plate with a connection of good thermal and electrical conductivity, said cooling means being adapted for the circulation of a liquid cooling medium therethrough, and each of said cover assemblies also having cover means for closing the end of the capacitor unit.

6. A capacitor unit having a generally cylindrical housing member of insulating material, a capacitance element disposed in the housing member, said capacitance element comprising alternate layers of metal foil and dielectric material, certain of the metal foils extending beyond the dielectric layers at one side of the capacitance element and others of the metal foils extending beyond the dielectric layers at the other side, a metal plate at each side of the capacitance element, means for clamping said plates against the adjacent sides of the capacitance element, the extending foils at each side of the capacitance element being joined to the metal plate at that side with a connection of good thermal and electrical conductivity, means for sealing said metal plates to the housing member adjacent their peripheries, an annular conduit for the circulation of cooling medium on each of said plates, said conduits being in electrically conductive relation to the respective plates, and metal cover members secured to said conduits for closing the ends of the capacitor unit.

7. A capacitor unit having a generally cylindrical housing member of insulating material, a capacitance element disposed in the housing member, said capacitance element comprising alternate layers of metal foil and dielectric material, certain of the metal foils extending beyond the dielectric layers at one side of the capacitance element and others of the metal foils extending beyond the dielectric layers at the other side, a metal plate at each side of the capacitance element, means for clamping said plates against the adjacent sides of the capacitance element, said plates having a plurality of openings therein, and the extending foils at each side of the capacitance element being joined to the plate at that side through at least some of said openings with a connection of good thermal and electrical conductivity, means for sealing said metal plates to the housing member adjacent their peripheries, an annular conduit for the circulation of cooling medium on each of said plates, said conduits being in electrically conductive relation to the respective plates, and metal cover members secured to said conduits for closing the ends of the capacitor unit.

RALPH E. MARBURY.